US007765119B2

(12) United States Patent
Messa

(10) Patent No.: US 7,765,119 B2
(45) Date of Patent: Jul. 27, 2010

(54) SYSTEM AND METHOD FOR PREDICTIVE BOOKING OF RESERVATIONS BASED ON HISTORICAL AGGREGATION AND EVENTS

(75) Inventor: Suzette Messa, Ben Lomond, CA (US)

(73) Assignee: Rearden Commerce, Inc., Foster City, CA (US)

( * ) Notice: Subject to any disclaimer, the term of this patent is extended or adjusted under 35 U.S.C. 154(b) by 295 days.

(21) Appl. No.: 11/549,962

(22) Filed: Oct. 16, 2006

(65) Prior Publication Data

US 2008/0091478 A1 Apr. 17, 2008

(51) Int. Cl.
G06Q 10/00 (2006.01)
(52) U.S. Cl. .......................................... 705/5
(58) Field of Classification Search ........ 705/5
See application file for complete search history.

(56) References Cited

U.S. PATENT DOCUMENTS

| | | | |
|---|---|---|---|
| 5,692,125 A | 11/1997 | Schloss et al. | |
| 5,790,974 A | 8/1998 | Tognazzini | |
| 5,839,114 A * | 11/1998 | Lynch et al. | 705/5 |
| 5,892,909 A | 4/1999 | Grasso et al. | |
| 6,104,788 A | 8/2000 | Shaffer et al. | |
| 6,119,094 A * | 9/2000 | Lynch et al. | 705/5 |
| 6,636,888 B1 | 10/2003 | Bookspan et al. | |
| 6,836,537 B1 | 12/2004 | Zimgibl et al. | |
| 6,898,569 B1 | 5/2005 | Bansai et al. | |
| 7,010,494 B2 * | 3/2006 | Etzioni et al. | 705/1 |
| 7,139,722 B2 | 11/2006 | Perrella et al. | |
| 7,283,970 B2 | 10/2007 | Cragun et al. | |
| 7,373,243 B2 * | 5/2008 | Tengler et al. | 701/201 |
| 7,421,401 B2 | 9/2008 | Demsky et al. | |
| 7,426,537 B2 | 9/2008 | Lee et al. | |
| 7,430,724 B2 | 9/2008 | Othmer | |
| 2002/0049644 A1 | 4/2002 | Kargman | |
| 2003/0229900 A1 | 12/2003 | Reisman | |
| 2004/0064585 A1 | 4/2004 | Doss et al. | |
| 2004/0117275 A1 | 6/2004 | Billera | |

(Continued)

OTHER PUBLICATIONS

Rubin, Rose M. et al. "Where Are the Airlines Headed? Implications of Airline Industry Structure and Change for Consumers". Journal of Consumer Affairs. Summer 2005. v39n1 pp. 215-228.*

(Continued)

*Primary Examiner*—John W Hayes
*Assistant Examiner*—Allen J Jung
(74) *Attorney, Agent, or Firm*—Greenberg Traurig, LLP

(57) ABSTRACT

In one embodiment, a method that can be performed on a system, is provided for predictive booking or reservations based on historical aggregation and events. In one embodiment, the method comprises surveying prices paid for traveler purchases or reservations to identify price increases for travel purchases or reservations, wherein the price increases include a increase in a price of a travel purchase during an identified period of time; identifying a correlation between identified price increases for travel purchases or reservations and identified events; predicting of future price increases in select travel bookings based on the identified correlation between the identified price increases for travel purchases or reservations and identified events; and determining whether to purchase or reserve a set of travel bookings based on the predicting of the future price increases.

21 Claims, 4 Drawing Sheets

U.S. PATENT DOCUMENTS

| | | |
|---|---|---|
| 2004/0261013 A1 | 12/2004 | Wynn et al. |
| 2005/0192851 A1 | 9/2005 | Rangnekar |
| 2006/0168592 A1 | 7/2006 | Andrews et al. |
| 2007/0168243 A1 | 7/2007 | Chen et al. |
| 2008/0086455 A1 | 4/2008 | Meisels et al. |
| 2008/0167937 A1 | 7/2008 | Coughlin et al. |
| 2008/0195312 A1 | 8/2008 | Aaron et al. |
| 2009/0030609 A1 | 1/2009 | Orttung et al. |
| 2009/0030742 A1 | 1/2009 | Orttung et al. |
| 2009/0030769 A1 | 1/2009 | Orttung et al. |
| 2009/0055235 A1 | 2/2009 | Oral et al. |
| 2009/0101710 A1 | 4/2009 | Chakravarthy |
| 2009/0172097 A1 | 7/2009 | O'Sullivan et al. |

OTHER PUBLICATIONS

Orbitz, LLC, search results of online search for flights at www.orbitz.com, Mar. 11, 2009.

Farber, Dan, "Rearden Commerce Transforms Business Services," ZDNet, Feb. 27, 2005.

Rearden Commerce, "Rearden Commerce Releases New Version of Its Employee Business Services Application," Press Release, Feb. 28, 2005.

\* cited by examiner

SYSTEM AND METHOD FOR PREDICTIVE BOOKING OF RESERVATIONS BASED ON HISTORICAL AGGREGATION AND EVENTS

CROSS-REFERENCE TO RELATED APPLICATIONS

This application is related to U.S. patent application Ser. No. 11/112,376, Filed Apr. 21, 2005, entitled, "Aggregate Collection Of Travel Data", U.S. patent application Ser. No. 11/178,007, filed Jul. 31, 2005, entitled, "System for Travel Services Resource U.S. patent application Ser. No. 11/240,739, Filed Sep. 30, 2005, entitled "Method And System For Capturing And Calculating Complex Consumer Ratings Of Goods And Services" and U.S. patent application Ser. No. 11/240,740, filed Sep. 30, 2005 entitled: "Method And System For Testing Of Policies To Determine Cost Savings", all of which are incorporated herein by reference.

BACKGROUND OF THE INVENTION

People often make travel bookings according to a predetermined set of rules, or according to their accustomed travel arrangements. However, certain types of bookings may often result in costly changes at the last minute. It may be that booking different types travel arrangements, for example, in a different travel class with no change penalty, may be a wiser choice for certain bookings, such as, for example, bookings for travel and accommodations for a convention or for a customer meeting that may often require last-minute changes.

What is clearly needed is a system, method and apparatus for tracking booking behavior patterns of travelers, and, based on historical aggregate data and internal and external events, for suggesting better booking methods for initial bookings, resulting in a lower average over-all cost.

Often people travel to the same destination or use the same accommodations repeatedly, and they may notice other people who also make the same trip or use the same accommodations repeatedly. However, there is no good way for a person to meet these other travelers and the person is also concerned about doing so without previously knowing something about the person or persons he would like to meet.

What is clearly needed is a system, method, and apparatus that allows unacquainted travelers who travel the same routes or use the same facilities or services, etc. to enter into a social network in a controlled manner.

Travel resources associated with certain events tend to become very scarce as the event approaches. For example, flights and hotel rooms to a large industry exposition tend to be booked weeks or even months ahead of time. In cases of annual events, these resources may be booked even years ahead of time.

What is clearly needed is a system and method that takes into consideration planning for such events and accordingly blocks and books reservations for customers based on their past travel patterns. In some cases the system could even go beyond that and book rooms for speculative "banking" of travel assets such as hotel rooms and flight capacity.

SUMMARY

In one embodiment, a method that can be performed on a system, is provided for predictive booking or reservations based on historical aggregation and events. In one embodiment, the method comprises surveying prices paid for traveler purchases or reservations to identify price increases for travel purchases or reservations, wherein the price increases include a increase in a price of a travel purchase during an identified period of time; identifying a correlation between identified price increases for travel purchases or reservations and identified events; predicting of future price increases in select travel bookings based on the identified correlation between the identified price increases for travel purchases or reservations and identified events; and determining whether to purchase or reserve a set of travel bookings based on the predicting of the future price increases.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
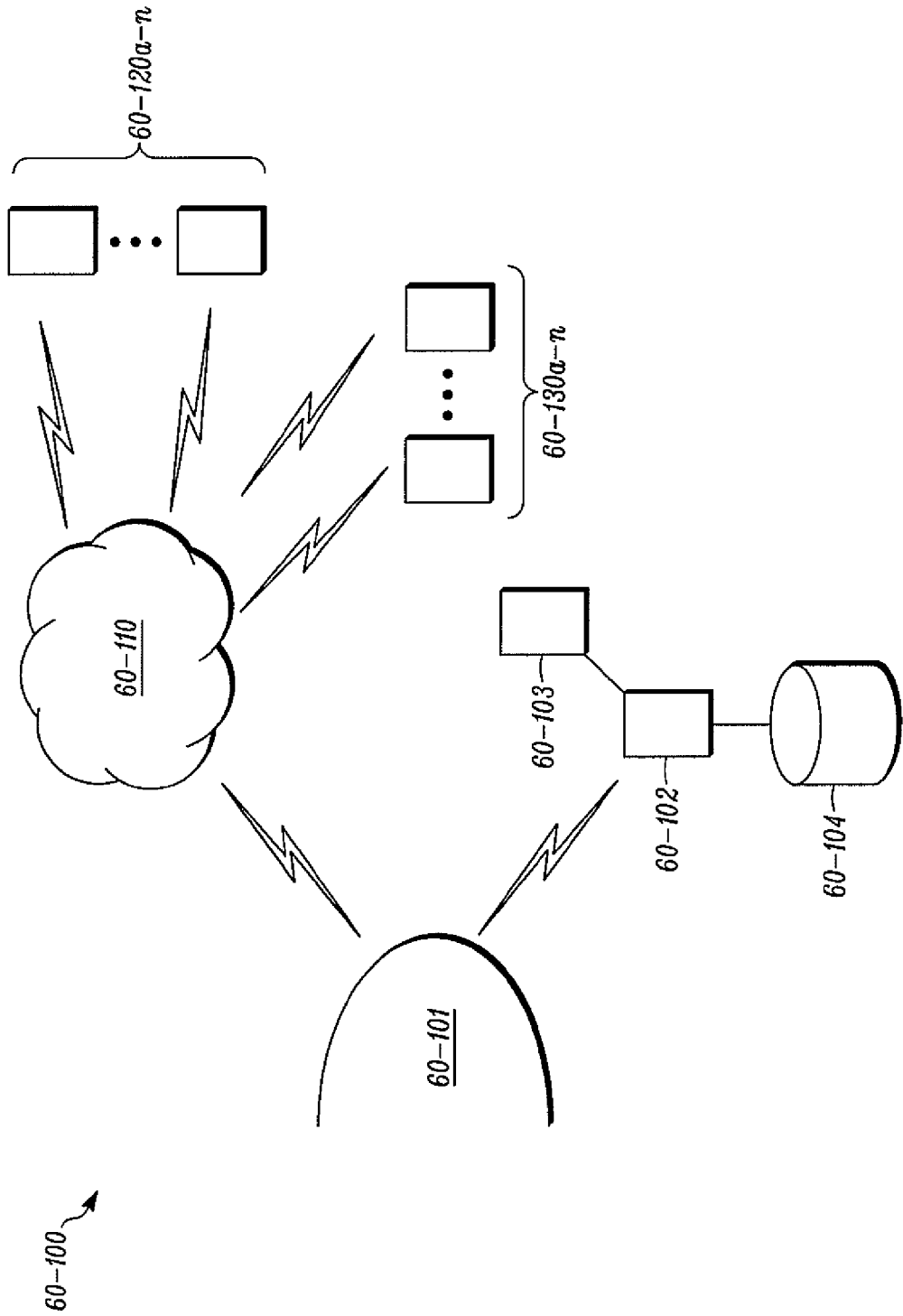
FIG. 1 shows an overview of a system according to one embodiment.

FIG. 1 shows an overview of a system 100 according to the present invention. An electronic services system 101 has a server 102 that hosts a software instance 103 and has access to a data repository or database 104. It is clear that this simplified depiction shows only elements of interest pertaining to the present invention, and that all these elements may be part of a much larger system. Also shown is a connection of electronic services system 101 to the Internet 110, to which users 130a-n and vendors 120a-n are also connected. It is clear that in some cases the users and/or vendors may be connected to services system 101 directly, or through a private network or VPN or some other type of network connection without departing from the spirit of the invention.

Figure 2:
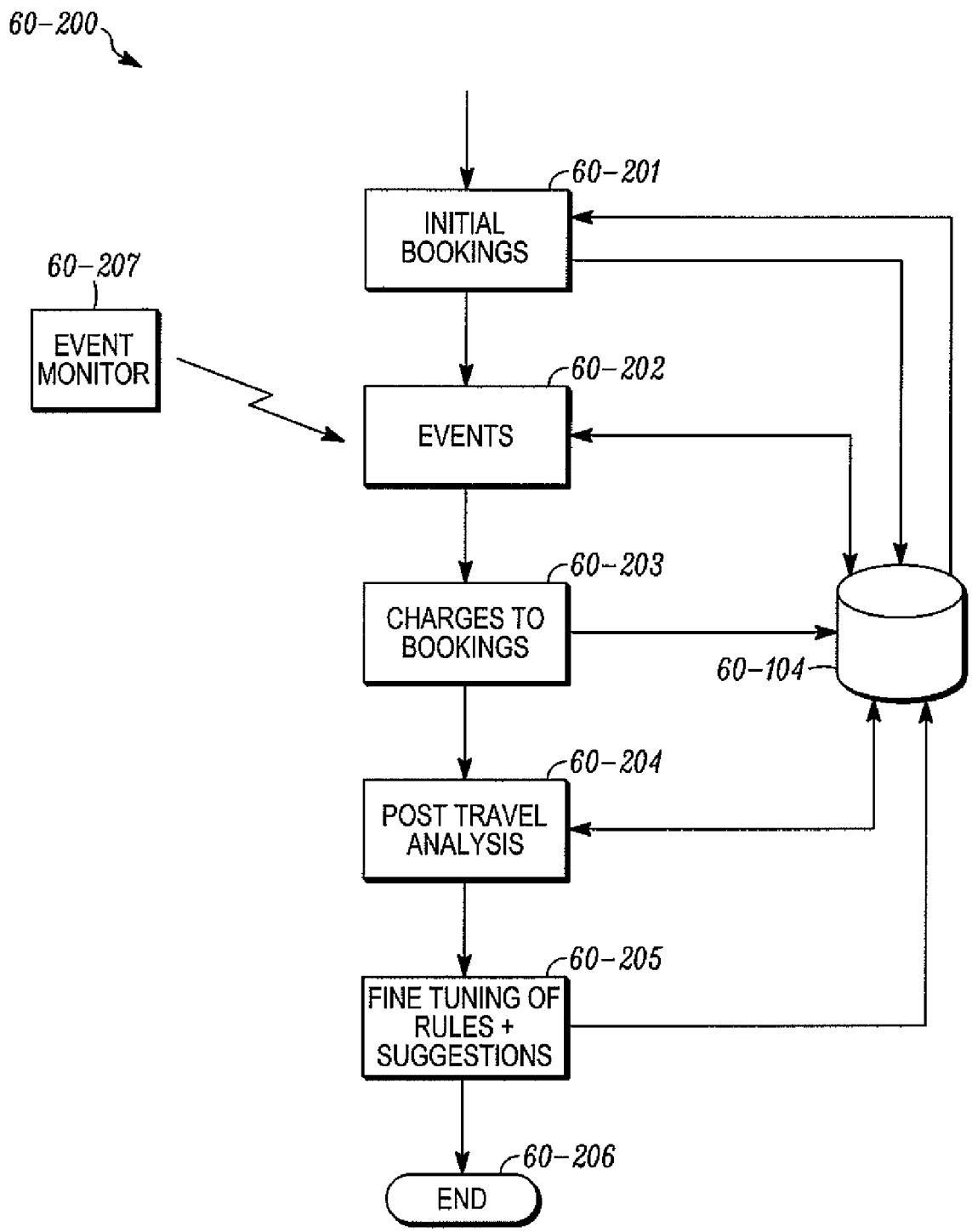
FIG. 2 shows an exemplary process for implementation of the system according to one embodiment.

FIG. 2 shows an exemplary process 200 for implementation of the system according to one embodiment of the present invention. In step 201 a user makes an initial booking, in some cases based on recommendations by the system, which recommendations are stored in database 104. It will be discussed later how these recommendations are generated, but in essence they are based on the rules that apply for this individual user, with some variations as discussed below. In step 202, an event monitor 207 monitors events relevant to the traveler's plans, including events in the traveler's own agenda and schedules within his company, external events along his travel route and at his accommodations (in all the cities and countries that are included in the travel route), and also events at partner companies that he is visiting. Based on those events, in step 203, the user may need to make changes in his bookings. The correlation between the changes and the monitored events are stored in database 104, as well as the changes themselves.

After the traveler returns from his trip, in step 204, the system does a post-travel analysis to determine whether some of the penalties and fees invoked by travel changes could have been avoided or lowered had different types of bookings been made. These analysis results are also stored in database 104. In step 205, the system makes a fine-tuning of rules and suggestions, based on the historic aggregate of relevant travels of both this user and other users who followed the same route, and in step 206, the process ends. For example, a large event at a target location may have led to cancellations or changes in hotel reservations or overbooking of flights, and therefore to unacceptable delays or problems in users' travel plans. Thus the system may determine that the traveler should have initially purchased an unrestricted ticket, allowing him to avoid change penalties, etc.

In some cases, a novel aspect of the software system includes attributes for a trip that the electronic services system would look at for both new and historical trips. Some example attributes of a trip could include the following: reason for trip (e.g., sales call, maintenance call, industry conference, internal meeting, etc.), specific parties involved in the trip (e.g., customer A, internal colleague B, industry conference C, etc.), specific location (e.g., a given city, convention center, or a property of a city such as being a European city or an Asian city), timing (e.g., time of year, the fact that the trip is on a Monday or Friday, proximity to a major holiday, etc.), proximity to other activities on a user's calendar (e.g., do other meetings in different cities tightly adjacent introduce additional travel change risk, do tentative, conflicting meetings on the user's calendar make a change more likely), user-defined priority of the event (e.g., the user could state that this is a Tier 1 customer or a Tier 2 customer, which could inform whether the trip is likely to change), and other attributes of the trip, both defined by the user and derived from the attributes of the proposed and past trips.

Additionally, in yet other cases, the system could offer a display of the same booking with different rate/restriction combinations. For example, a hotel room may be available at a given hotel with three options. Option A might have a large penalty for change and a pre-payment requirement, option B might have only a penalty if not cancelled 24 hours ahead, but a higher per night rate, and option C might have a slightly higher rate, but include amenities such as parking, breakfast, and Internet access. In these cases, a novel part of the system would be a display that shows a specific hotel with multiple booking options all in a tightly integrated display.

Dynamic Social Networking Based on Similar Travel Itineraries

Figure 3:
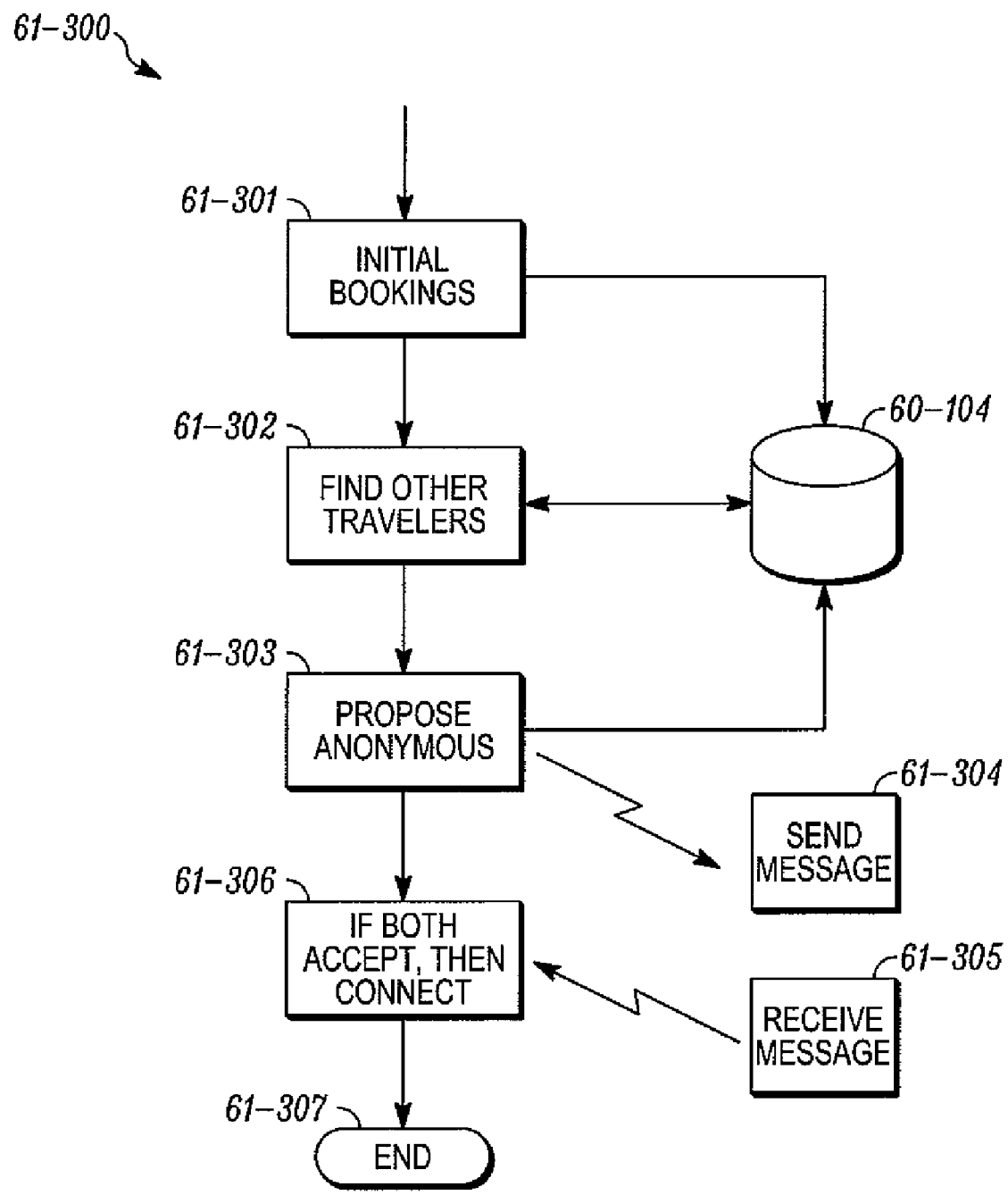
FIG. 3 shows an exemplary process for implementation of the system according to one embodiment of the present invention.

FIG. 3 shows an exemplary process 300 for implementation of the system according to one embodiment of the present invention. In step 301, the system makes a travel booking and stores the booking information in database 104. In step 302, the system searches database 104 to find other travelers who have the same bookings for some or all of the itinerary. In some cases, the system may also search other available data from other sources. In step 303, the system asks the original traveler if he wants to send out an anonymous proposal to meet via function 304 to another traveler to meet at a mutual itinerary point. Unlike "chance meetings", meetings could be arranged between total strangers, of unrelated companies, if so desired.

In one embodiment, the system also allows the user to define when they want to meet. Some examples of more instructions on when include time ranges such as "evenings." In one embodiment, the timing is dependent on other information fed into the system via a calendar.

For example the user can identify any time that their calendar shows as free is potentially open to a meeting. The user could also define an explicit prioritization of times. For example, the user could state that their top priority time would be during the lunch hour, followed by a second priority being during the dinner hour, followed by other times that are free as a third priority.

In one embodiment, the system could also allow the user to input preferences on the type of activity that they would like to invite others to join. For example, they might input that they would prefer to share a meal or attend an event with others. Within the category of events, they would rank the types of events they would like to find people to invite. For example, a user might rank Yankee games as their top priority, baseball games in general as their second priority, and sporting events as their third priority.

It is clear that many modifications and variations of this embodiment may be made by one skilled in the art without departing from the spirit of the novel art of this disclosure. In some cases. as part of the anonymous proposal program, for example, the company may have certain rules about their employees meeting with employees from certain other companies (such as competitors or adversaries). Thus a traveler could specify that he does not want to meet other travelers from company XYZ, or he could submit a list of individuals he does not wish to meet, for whatever reason. Any response is received via function 305. Then in step 306, if both travelers accept the proposal, they may make a connection. The process ends at step 307. In some cases, in case of a rejection, the reason for the rejection would not be disclosed, or even the fact of a rejection. Rather, the system would respond with a laconic, non-disclosing "no match found" type of message.

One embodiment includes the ability to book the same or similar arrangements as others, including making alternative recommendations and perform the booking if the user request (e.g., car rentals). In one embodiment, if the user learns that a colleague is going to the same location (e.g. headquarters office) then it may be more cost effective to cancel your car booking and ride with the other person.

Predictive Booking of Reservations Based on Historical Aggregation and Events

Figure 4:
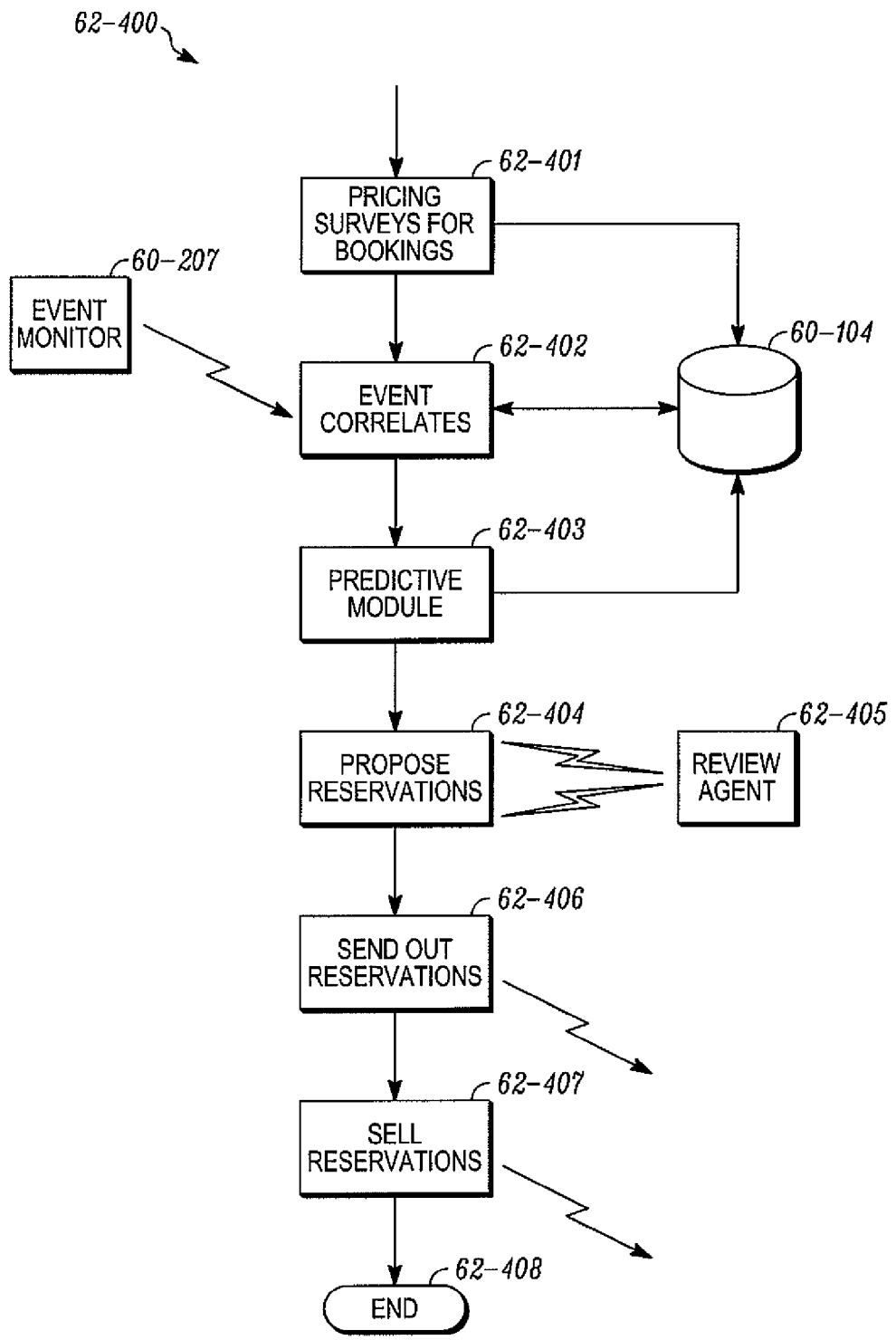
FIG. 4 shows an exemplary process for implementation of the system according to one embodiment of the present invention.

FIG. 4 shows an exemplary process 400 for implementation of the system according to one embodiment of the present invention. In step 401 the system makes pricing surveys travelers' bookings that are often repeated. In step 402 the system correlates events to those results of the pricing surveys and to pricing changes over various time periods, for example, daily, weekly, monthly, or even yearly repetitions, using event monitor 207. Events could include such things are fare changes, fare wars, related events such as trade shows in the area, family events of travelers, and other internal and external events. The system can also use the context of travelers' bookings to predict shortages and reserve for banking travel "futures" such as flights and hotel rooms.

The event correlations in step 402 are then fed into a predictive module in step 403, which, based on the reservations already executed for an event and the typical relationship of the current reservations to the total reservation expectations, in step 404 proposes an additional block of reservations to secure sufficient capacity for expected customer demand. These proposed reservations may, optionally, be reviewed by a review agent 405. The system then books the reservations in step 406, and in step 407 the system sells those reservations to customers, based on past behavior and expectations. The process then ends at step 408.

In one embodiment, the ability to accurately predict when a resource will sell out is visually displayed to a shopper/user, to re-enforce the need to purchase immediately. By indicating when a resource will go scarce, the system would improve look to book ratios.

It is clear that many modifications and variations of this embodiment may be made by one skilled in the art without departing from the spirit of the novel art of this disclosure.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.).

What is claimed is:

1. A method comprising:
    performing a post-travel analysis for each of a plurality of travelers after each traveler returns from a trip;
    storing results from the post-travel analysis in a data repository or database;
    surveying prices paid for travel purchases or reservations to identify price increases for travel purchases or reservations, wherein the price increases include an increase in a price of a travel purchase during an identified period of time, and wherein the travel purchases or reservations surveyed are purchases or reservations repeated more often than a threshold frequency;
    identifying, by a computer system, a correlation between identified price increases for travel purchases or reservations and identified events;
    predicting, by the computer system, of future price increases in select travel bookings based on the identified correlation between the identified price increases for travel purchases or reservations and the identified events;
    purchasing or reserving, using the an electronic services computer system, a set of travel bookings for a first event of the identified events based on the following: the predicting of the future price increases, the post-travel analysis, purchases or reservations already executed for an event, and a relationship of current purchases or reservations to total purchase or reservation expectations for the event based on stored historical aggregate data from prior travelers;
    subsequent to purchasing or reserving the set of travel bookings, receiving a request from a customer for information regarding available travel resources for the first event; and
    selling one or more of the set of travel bookings to the customer.

2. The method of claim 1, further comprising identifying a quantity of selected travel bookings to be purchased or reserved, the identifying of the quantity based on the identified correlation between the price increases and identified events.

3. The method of claim 1, wherein the identified period of time is at least one of daily, weekly, monthly, and yearly.

4. The method of claim 1, wherein the surveying prices includes surveying for past and future travel purchases or reservations.

5. The method of claim 4, wherein purchasing or reserving the set of travel bookings is performed automatically.

6. The method of claim 4, wherein the identified events include at least one of an internal event and an external event.

7. The method of claim 4, wherein the identified events include a company event.

8. The method of claim 4, wherein the identified events include one or more of a sporting event, a holiday, trade shows, and exhibits.

9. The method of claim 6, wherein the travel bookings include a booking for at least one of an airline flight, auto rental, and hotel room.

10. A non-transitory machine readable medium having stored thereon a set of instructions which when executed perform a method comprising:
    surveying prices paid for travel purchases or reservations to identify price increases for travel purchases or reservations, wherein the price increases include an increase in a price of a travel purchase during an identified period of time, and wherein the travel purchases or reservations surveyed are purchases or reservations repeated more often than a threshold frequency;
    identifying a correlation between identified price increases for travel purchases or reservations and identified events;
    predicting of future price increases in select travel bookings based on the identified correlation between the identified price increases for travel purchases or reservations and identified events;
    purchasing or reserving a set of travel bookings for a first event of the identified events based on the predicting of the future price increases;
    subsequent to purchasing or reserving the set of travel bookings, receiving a request from a customer for information regarding available travel resources associated with the first event; and
    selling one or more of the set of travel bookings to a customer;
    wherein the surveying prices includes surveying for past and future travel purchases or reservations.

11. The machine readable medium of claim 10, further comprising identifying a quantity of selected travel bookings to be purchased or reserved, the identifying of the quantity based on the identified correlation between the price increases and identified events.

12. The machine readable medium of claim 10, wherein the identified period of time is at least one of daily, weekly, monthly, and yearly.

13. The machine readable medium of claim 10, wherein purchasing or reserving the set of travel bookings is performed automatically.

14. The machine readable medium of claim 10, wherein purchasing or reserving the set of travel bookings is performed by a person.

15. The machine readable medium of claim 10, wherein the identified events include at least one of an internal event and an external event.

16. The machine readable medium of claim 10, wherein the identified events include a company event.

17. The machine readable medium of claim 10, wherein the identified events include one or more of a sporting event, a holiday, trade shows, and exhibits.

18. The machine readable medium of claim 15, wherein the travel bookings include a booking for at least one of an airline flight, auto rental, and hotel room.

19. The method of claim 1, further comprising, prior to selling the one or more travel bookings to the customer, causing display of a prediction to the customer as to when a resource associated with one or more of the travel bookings will sell out.

20. The machine readable medium of claim 10, wherein the method further comprises:
 performing a post-travel analysis for each of a plurality of travelers after each traveler returns from a trip;
 storing results from the post-travel analysis in a data repository or database; and
 wherein the purchasing or reserving is further based on the post-travel analysis.

21. A method comprising:
 surveying prices paid for travel purchases or reservations to identify price increases for the travel purchases or reservations, wherein the price increases include an increase in a price of a travel purchase during an identified period of time;
 preparing, using a computer system, a correlation of the identified price increases with identified events;
 preparing, using the computer system, a prediction of future price increases for a first event of the identified events based on the correlation;
 reserving, using the computer system, a set of travel bookings to secure additional capacity for expected customer demand for the first event, the reserving being based on the prediction of future price increases;
 receiving a request from a customer for information regarding available travel resources associated with the first event;
 sending a prediction for display to the customer regarding when a resource associated with the first event will sell out; and
 after receiving the request and sending the prediction, selling one or more of the set of travel bookings for the first event to the customer.

* * * * *